(12) United States Patent
Guo et al.

(10) Patent No.: US 8,302,124 B2
(45) Date of Patent: Oct. 30, 2012

(54) HIGH-SPEED PROGRAMS REVIEW

(75) Inventors: Terry Qing Guo, Mountain View, CA (US); Haoyun Wu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 507 days.

(21) Appl. No.: 11/820,851

(22) Filed: Jun. 20, 2007

(65) Prior Publication Data

US 2008/0320511 A1  Dec. 25, 2008

(51) Int. Cl.
*G06F 3/00* (2006.01)
*G06F 13/00* (2006.01)
*G06F 3/048* (2006.01)
*H04N 5/445* (2011.01)

(52) U.S. Cl. ............ 725/41; 725/52; 715/786; 715/810

(58) Field of Classification Search .................. None
See application file for complete search history.

(56) References Cited

U.S. PATENT DOCUMENTS

| | | | |
|---|---|---|---|
| 5,585,838 A * | 12/1996 | Lawler et al. | 725/54 |
| 5,677,708 A * | 10/1997 | Matthews et al. | 345/684 |
| 6,360,053 B1 | 3/2002 | Wood et al. | |
| 6,847,778 B1 | 1/2005 | Vallone et al. | |
| 6,847,779 B2 | 1/2005 | Pietraszak et al. | |
| 6,909,837 B1 | 6/2005 | Unger | |
| 6,970,640 B2 | 11/2005 | Green et al. | |
| 7,116,891 B2 | 10/2006 | Borden, IV | |
| 7,152,209 B2 | 12/2006 | Jojic et al. | |
| 2003/0208767 A1 | 11/2003 | Williamson et al. | |
| 2004/0205482 A1 | 10/2004 | Basu et al. | |
| 2005/0028213 A1 | 2/2005 | Adler et al. | |
| 2005/0163477 A1 | 7/2005 | Kendall | |
| 2005/0210145 A1 | 9/2005 | Kim et al. | |
| 2005/0283810 A1 | 12/2005 | Ellis et al. | |
| 2006/0064716 A1 * | 3/2006 | Sull et al. | 725/37 |
| 2006/0267995 A1 * | 11/2006 | Radloff et al. | 345/530 |
| 2007/0025688 A1 | 2/2007 | Pejhan et al. | |
| 2007/0107010 A1 | 5/2007 | Jolna et al. | |
| 2008/0276273 A1 * | 11/2008 | Billmaier et al. | 725/37 |

FOREIGN PATENT DOCUMENTS

| | | |
|---|---|---|
| CN | 1540988 | 10/2004 |
| KR | 1020020053804 A | 5/2002 |
| KR | 1020030078940 A | 10/2003 |
| WO | WO-9904561 | 1/1999 |

OTHER PUBLICATIONS

"PCT Search Report and Written Opinion", Application No. PCT/US2008/066523, (Dec. 24, 2008), 8 pages.

(Continued)

*Primary Examiner* — Kristine Kincaid
*Assistant Examiner* — Omar S Parra
(74) *Attorney, Agent, or Firm* — Wolfe-SBMC

(57) ABSTRACT

High-speed programs review is described. In embodiment(s), a television client device can initiate a high-speed review of a group of programs that have been recorded together. A content distributor may record a group of television programs that have been previously broadcast for a particular television channel, and then maintain the programs for on-demand viewing when selected by a viewer. The client device can receive program information from the content distributor, and the program information can identify each of the progress when reviewing the group of programs at high-speed. The program information that corresponds to a program can then be rendered for display when the program becomes selectable for on-demand viewing while reviewing the programs at high-speed.

18 Claims, 6 Drawing Sheets

OTHER PUBLICATIONS

"Extended European Search Report", EP Application No. 08770680.0, (Jul. 26, 2010), 6 pages.

"YouTube—Broadcast Yourself", Retrieved from: <http://www.web.archive.org/web/20051001143606/http://www.youtube.com> on Sep. 7, 2007, (2005), 2 pages.

"YouTube Homepage, Categories browsing", Retrieved from: <http://web.archive.org/web/20060826163534/youtube.com/index> on Aug. 4, 2008, 4 pages.

"Foreign Office Action", Chinese Application No. 200880021280.7, (Jun. 15, 2011), 13 pages.

"Codian IP VCR IP VCR 2200 Series Getting Started: Watching and Creating Recordings", pp. 1-8.

"Suitable MP3 Portable Players", pp. 1-6.

IBM Research—"Video Semantic Summarization Systems", pp. 1-12.

* cited by examiner

HIGH-SPEED PROGRAMS REVIEW

BACKGROUND

Viewers have an ever-increasing selection of television programming to choose from, and may want to locate programming choices that are of interest to them. In addition to scheduled television program broadcasts, television viewing options also include on-demand choices which enable a viewer to search for and request media content when convenient for viewing rather than at a scheduled broadcast time. On-demand media content choices can also include previously broadcast programming that is recorded at a content distributor and made available for viewing days after the programs were originally broadcast.

A problem with recording all of the program broadcasts at a point of distribution, however, is organizing and making the many programs available so that a viewer can locate and request a previously broadcast program. Current television client devices that receive video content in the form of on-demand entertainment may provide a viewer with the convenient functionality of being able to pause, rewind, and fast-forward a television program. However, current fast-forward and rewind techniques only allow a viewer to quickly advance through a single recorded movie or television program. There is no provision for advancing or reviewing large volumes of programs that are recorded together and that may reside in a common memory.

SUMMARY

This summary is provided to introduce simplified concepts of high-speed programs review. The simplified concepts are further described below in the Detailed Description. This summary is not intended to identify essential features of the claimed subject matter, nor is it intended for use in determining the scope of the claimed subject matter.

In embodiment(s) of high-speed programs review, a television client device can initiate a high-speed review of a group of programs that have been recorded together. A content distributor may record a group of television programs that have been previously broadcast for a particular television channel, and then maintain the programs for on-demand viewing when selected by a viewer. The client device can receive program information from the content distributor, and the program information can identify each of the programs when reviewing the group of programs at high-speed. The program information can include any one or combination of a program information page, a program image page, or a video frame of the program. The program information that corresponds to a program can then be rendered for display when the program becomes selectable for on-demand viewing while reviewing the programs at high-speed.

BRIEF DESCRIPTION OF THE DRAWINGS

Embodiments of high-speed programs review are described with reference to the following drawings. The same numbers are used throughout the drawings to reference like features and components.

DETAILED DESCRIPTION

Embodiments of high-speed programs review allows a viewer to quickly advance through television programs and other stored media content that is recorded together and maintained with a common storage media. For example, a content distributor may record a group of television programs that have been previously broadcast for a particular television channel, and then maintain the programs for on-demand viewing when selected by a viewer. All of the media content for a particular television channel can be saved for several days or weeks when recorded on a server at the content distributor.

A high-speed programs review provides a viewer with information by which to identify a program when reviewing the programs in a high-speed, fast-forward or fast-review mode. Displayed program information that corresponds to a group of recorded programs is more meaningful for a viewer rather than advancing (i.e., fast-forward or rewinding) through the programs faster than the current rates of 2× or 3×. Review rates that are faster than content fast-forward or rewind implementations would be too fast for a viewer to recognize the programs in the group of recorded programs.

While features and concepts of the described systems and methods for high-speed programs review can be implemented in any number of different environments, computing systems, entertainment systems, and/or other various configurations, embodiments of high-speed programs review are described in the context of the following example systems and environments.

Figure 1:
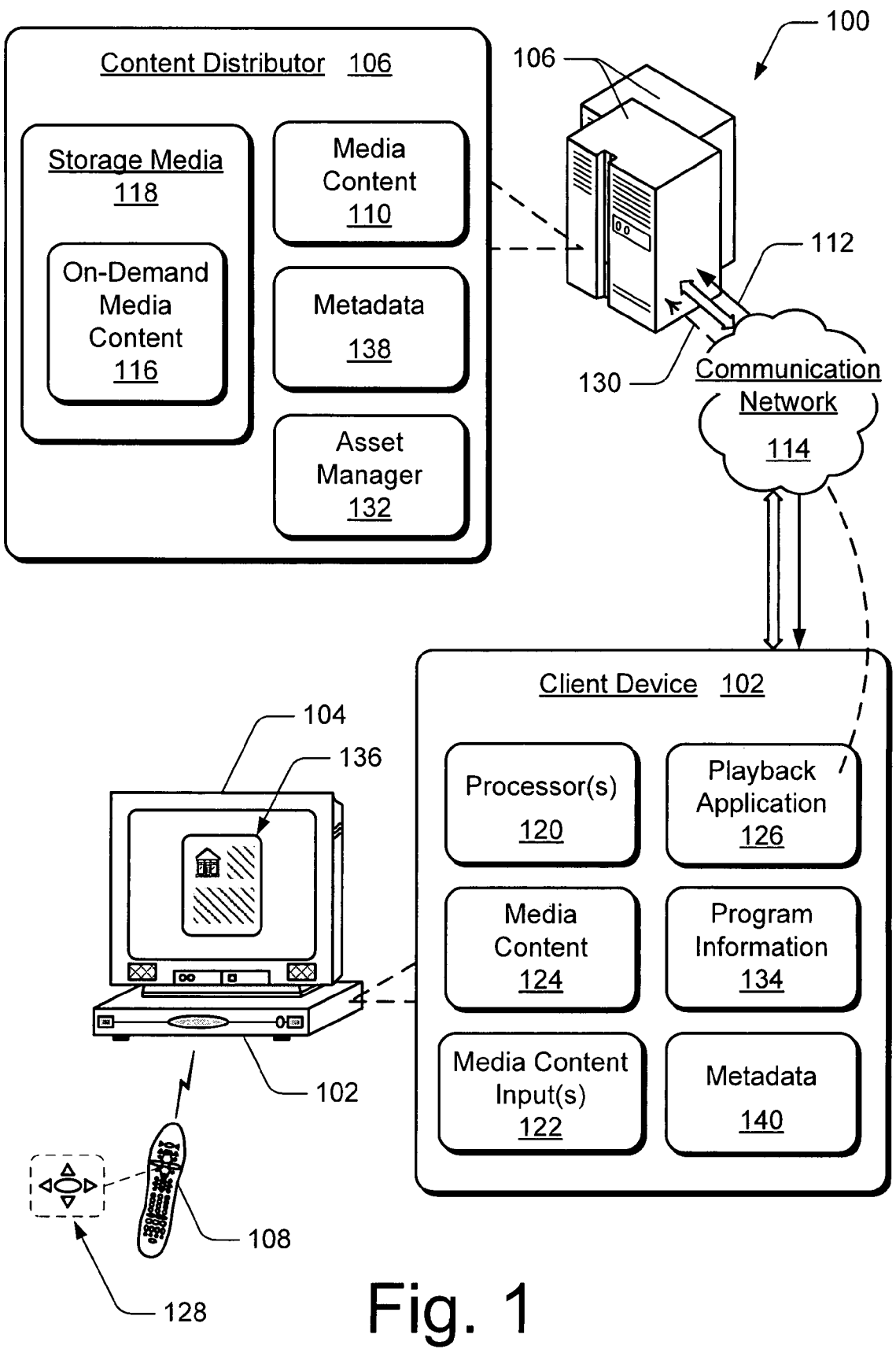
FIG. 1 illustrates an example system in which embodiments of high-speed programs review can be implemented.

FIG. 1 illustrates an example system 100 in which various embodiments of high-speed programs review can be implemented. In this example, system 100 includes a television client device 102, a display device 104, content distributor(s) 106, and an input device 108, such as a television remote control. The display device 104 can be implemented as any type of television, LCD, or similar television-based display system that renders audio, video, and/or image data. The client device 102 and display device 104 together are just one example of a television client system, examples of which are described with reference to the example entertainment and information system shown in FIG. 6.

Client device 102 can be implemented as any one or combination of a television set-top box, a digital video recorder (DVR) and playback system, an appliance device, a gaming console, and/or as any other type of television client device or computing-based device that may be implemented in a television entertainment and information system. Additionally, client device 102 can be implemented with any number and combination of differing components as further described with reference to the example computer-based device shown in FIG. 5. Client device 102 may also be associated with a user or viewer (i.e., a person) and/or an entity that operates the device such that a client device describes logical clients that include users, software, and/or devices.

A content distributor 106 can broadcast media content 110 to any number of television client devices as an IPTV multicast via an IP-based network 112 and/or a communication network 114. The media content 110 can include television programs (or programming) which may be any form of programs, commercials, music, movies, and video-on-demand media content. Other media content can include interactive games, network-based applications, and any other audio, video, and/or image content.

The IP-based network 112 can be implemented as part of the communication network 114 that facilitates media content distribution and data communication between the content distributor(s) 106 and any number of client devices, such as client device 102. The communication network 114 can be implemented as part of a media content distribution system using any type of network topology and/or communication protocol, and can be represented or otherwise implemented as a combination of two or more networks. The television client device 102 is configured for communication with the content distributor(s) 106 via the IP-based network 112 and/or the communication network 114.

The content distributor 106 can broadcast the media content 110 to any number of television client devices and then record and/or store the broadcast media content together as on-demand media content 116. For example, the content distributor 106 may record a group of television programs that have been previously broadcast for a particular television channel, and then maintain the programs for on-demand viewing when selected by a viewer. All of the media content for a particular television channel can be saved for several days or weeks when recorded on a server at the content distributor 106. The content distributor 106 includes storage media 118 to maintain the television media content as a group of programs that have been recorded together for distribution as on-demand programs (e.g., the media content 116).

Alternatively, or in addition, the on-demand media content 116 can be recorded and/or stored as a group of television programs or movies that are related by a common identifier. For example, the collection of on-demand media content 116 can be related by an actor, a genre, a particular television series, and/or by any other type of common identifier or identifiers.

In this example system 100, client device 102 includes one or more processor(s) 120, media content inputs 122, and media content 124 (e.g., received media content or media content that is being received). The media content inputs 122 can include any type of communication interfaces and/or data inputs, such as Internet Protocol (IP) inputs over which streams of media content (e.g., IPTV media content) are received via the IP-based network 112. Client device 102 can receive the media content 124 from any one or combination of content distributor(s) 106 via a media content input 122.

Client device 102 includes a playback application 126 that can be implemented as computer-executable instructions and executed by the processor(s) 120 to implement embodiments of high-speed programs review. A viewer can initiate a high-speed review of the recorded on-demand media content 116 that is maintained at the content distributor 106 with user inputs via selectable controls 128 of the remote control device 108. A high-speed review of the on-demand media content 116 can include a high-speed rewind of the group of programs or a high-speed advance of the group of programs. The playback application 126 can receive the viewer input and communicate the high-speed review request 130 to the content distributor 106 via the IP-based network 112.

The content distributor 106 includes an asset manager 132 that can receive the request 130 for a high-speed review of the on-demand media content 116 from the client device 102 via a two-way data communication link of the IP-based network 112. It is contemplated that any one or more of the arrowed communication links facilitate two-way data communication, such as from television client device 102 to a content distributor 106 and vice-versa.

In response to the request to review the stored on-demand media content 116, the content distributor 106 can communicate program information 134 to the television client device 102 which is received via a media content input 122. The program information 134 corresponds to each television program of the stored on-demand media content 116, and can be displayed as program information 136 for each program on display device 104. The displayed program information 136 that corresponds to a program is displayed such that a viewer can identify a program in the on-demand media content 116 when reviewing the programs at high-speed.

The program information 134 that corresponds to a program (e.g., in the on-demand media content 116) can be any combination of a program information page, a program image page, or a video frame of the program. The content distributor 106 includes metadata 138 that describes the media content 110, and that is associated with the stored on-demand media content 116. The metadata 138 can include a program information page, a program image page, or any other type of data such as text, graphics, and/or images from which to generate a program information page or a program image page. A video frame, or video frames, of a program can be obtained directly from a stored on-demand program and communicated to the client device 102.

In an embodiment, the metadata 138 at content distributor 106 can be streamed to the client device 102 as the program information 134 and rendered as the displayed program information 136 when the programs are reviewed at high-speed. Alternatively, or in some combination thereof, the content distributor 106 can download the metadata 138 corresponding to the stored on-demand media content 116 to the client device 102 that then stores the metadata 140 until being initiated for display as the program information 136. In addition, a program information page or program image page that corresponds to a program requires much less bandwidth and processing resources to download to client device 102, rather than accessing the video for every program and providing video frames for a typical fast-forward or fast-rewind of each individual program.

The displayed program information 136 provides a viewer with information by which to identify a program when reviewing the programs in a high-speed, fast-forward or fast-review mode. The displayed program information 136 is more meaningful for the viewer rather than advancing (i.e., fast-forward or rewinding) the media content 116 faster than current rates of 2× or 3× which would be too fast for a viewer to recognize the programs that are included in the on-demand media content 116. A high-speed programs review allows a viewer to quickly advance through television programs and other stored media content that is recorded together in storage media 118.

A program of the on-demand media content 116 becomes selectable for on-demand viewing when the corresponding program information 136 is displayed on the display device 104. If a viewer selects to request the program that corresponds to the displayed program information 136, the playback application 126 can receive the viewer input and then request the program from the content distributor 106 for viewing. In an embodiment, a viewer can be reviewing the program information that is displayed for each program of the on-demand media content 116, and then select "Play" on the remote control device 108 to initiate receiving a particular program from the content distributor 106 (i.e., the program that corresponds to the displayed program information 136).

Figure 2:
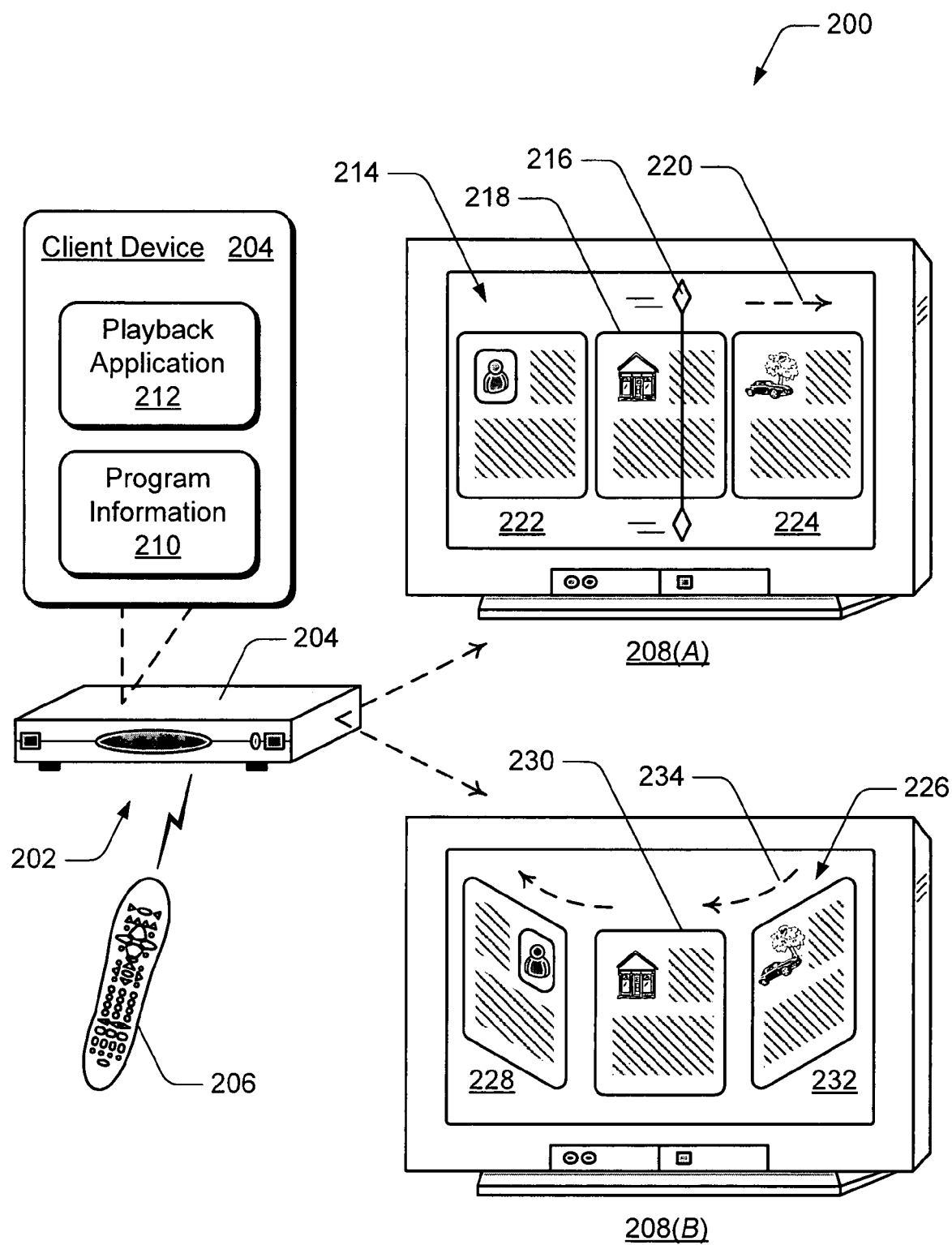
FIG. 2 illustrates an example television client system in which embodiments of high-speed programs review can be implemented.

FIG. 2 illustrates an example 200 of a television client system 202 that includes a television client device 204, an input device 206, and different representations of a display device 208(A-B) to illustrate various displays in embodiments of high-speed programs review. The client device 204 includes program information 210 and a playback application 212, an example of which is described with reference to playback application 126 shown in FIG. 1 to implement embodiments of high-speed programs review.

An example of program information 214 being displayed for a high-speed programs review is shown on display device 208(A). In this example, more than one program information page, program image page, and/or program video frame that each correspond to a program are displayed. For example, each of the displayed program information 214 corresponds to a television program, a movie, or other on-demand media content that has been recorded/or stored together as a group of programs. Also in this example, each of the program information 214 can transition across the display 208(A), such as left to indicate a high-speed, fast-forward programs review, or right to indicate a high-speed, fast-rewind programs review.

Alternatively, or in addition, a status indicator 216 can be implemented to move across the display 208(A) and over the program information 214. In this example, the status indicator 216 is over a program information page 218 to indicate that a program which corresponds to the program information page 218 is selectable for on-demand viewing. Additionally, the status indicator 216 can also indicate to a viewer a position of a high-speed review in relation to a program. For example, the status indicator 216 is shown to be moving across the display 208(A) in a direction 220 over the program information page 218. The position of the status indicator 216 indicates to a viewer that the high-speed review has advanced through approximately two-thirds of the program that corresponds to the program information page 218.

The program information 214 that is displayed for a high-speed programs review on display device 208(A) also shows transitions from one program information page (or image page, or video frame) to another. For example, the status indicator 216 is shown to be moving across the display 208(A) in direction 220 over the currently selectable program information page 218. As such, a program information page 222 corresponds to a previous program in the high-speed review, and program information page 224 corresponds to a next program in the high-speed review.

Another example of program information 226 being displayed for a high-speed programs review is shown displayed on display device 208(B). In this example, more than one program information page, program image page, and/or a program video frame that each correspond to a program are displayed. For example, each of the program information pages 228, 230, and 232 correspond to a television program, a movie, or other on-demand media content that has been recorded and/or stored together as a group of programs. Also in this example, each of the program information pages transition 234 across the display 208(B) such that program information pages corresponding to any number of previous or next programs in a high-speed programs review can be displayed.

Generally, any of the functions, methods, and modules described herein can be implemented using hardware, software, firmware (e.g. fixed logic circuitry), manual processing, or any combination thereof. A software implementation of a function, method, or module represents program code that performs specified tasks when executed on a computing-based processor. Example methods 300 and 400 described with reference to respective FIGS. 3 and 4 may be described in the general context of computer-executable instructions. Generally, computer-executable instructions can include applications, routines, programs, objects, components, data structures, procedures, modules, functions, and the like that perform particular functions or implement particular abstract data types.

The method(s) may also be practiced in a distributed computing environment where functions are performed by remote processing devices that are linked through a communications network. In a distributed computing environment, computer-executable instructions may be located in both local and remote computer storage media, including memory storage devices. Further, the features described herein are platform-independent such that the techniques may be implemented on a variety of computing platforms having a variety of processors.

Figure 3:
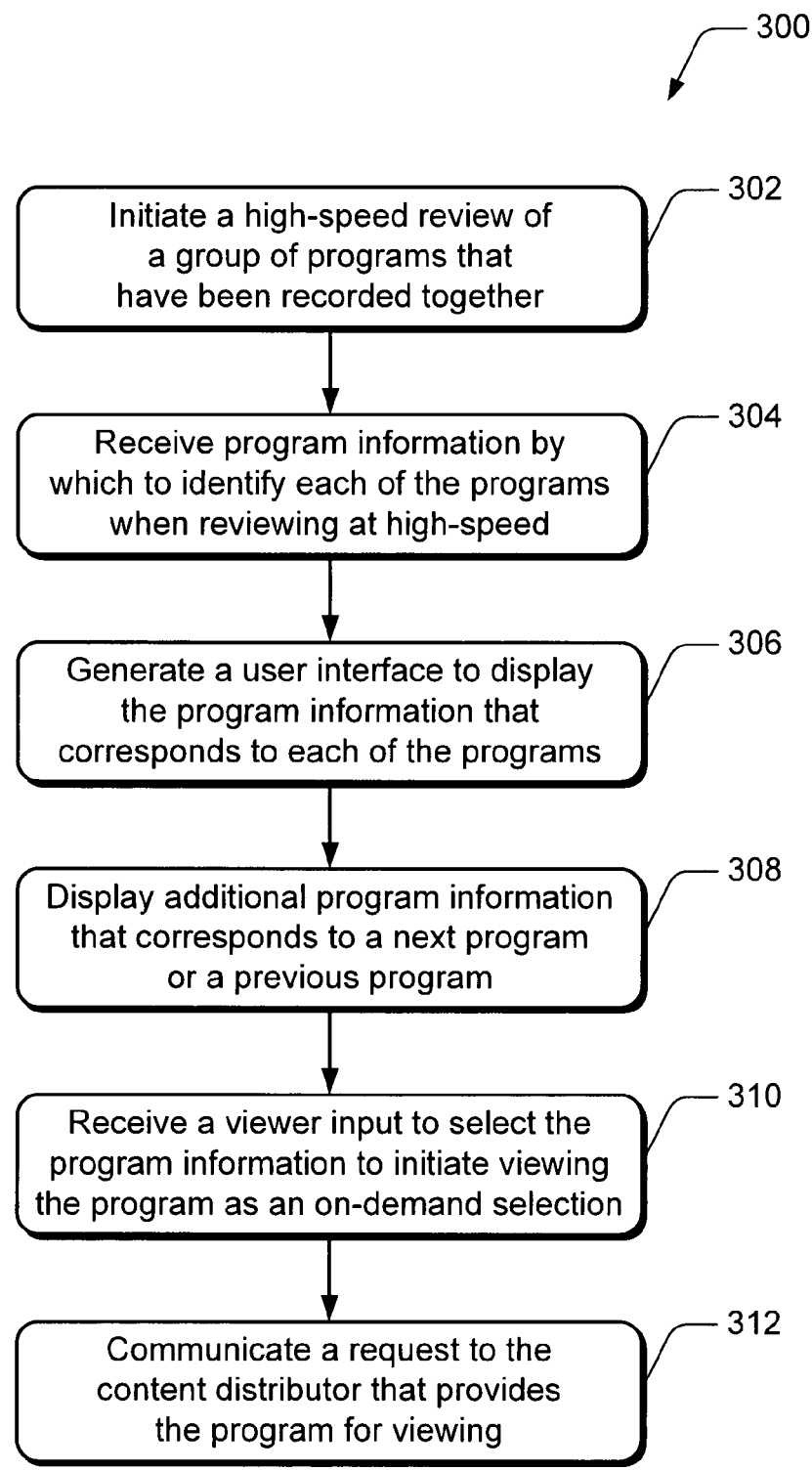
FIG. 3 illustrates example method(s) for high-speed programs review in accordance with one or more embodiments.

FIG. 3 illustrates example method(s) 300 of high-speed programs review, and is described with reference to television client device 102 shown in FIG. 1. The order in which the method is described is not intended to be construed as a limitation, and any number of the described method blocks can be combined in any order to implement the method, or an alternate method.

At block 302, a high-speed review of a group of programs that have been recorded together is initiated. For example, content distributor 106 may record a group of television programs that have been previously broadcast for a particular television channel, and then maintain the programs for on-demand viewing when selected by a viewer. Content distributor 106 includes storage media 118 to maintain television media content as a group of programs that have been recorded together for on-demand distribution. The client device 102 can receive a viewer input that is a request to review the recorded on-demand media content 116 that is maintained at content distributor 106. The client device 102 then initiates a high-speed review of the group of programs by communicating the viewer input to the content distributor 106. A high-speed review of the on-demand media content 116 can include a high-speed rewind of the group of programs or a high-speed advance of the group of programs.

At block 304, program information is received by which to identify each of the programs when reviewing at high-speed. For example, the client device 102 receives program information 134 from the content distributor 106, where the program information 134 that corresponds to a program includes any combination of a program information page, a program image page, or a video frame of the program.

At block 306, a user interface is generated to display program information that corresponds to each of the programs. For example, the program information 134 that is received at client device 102 corresponds to each television program of the stored on-demand media content 116, and can be displayed as program information 136 for each program on display device 104. The displayed program information 136 that corresponds to a program is displayed such that a viewer can identify a program in the on-demand media content 116 when reviewing the programs at high-speed. The program information that corresponds to each of the programs is rendered and displayed when a program becomes selectable for on-demand viewing on the display device 104.

At block 308, additional program information is displayed that corresponds to a next program or a previous program in the group of programs. In addition, a transition can be displayed to show the transition from the displayed program information for one program to another program. For example, more than one program information page, program image page, and/or program video frame that each correspond to a program are displayed on display device 208(B). Each of the program information pages 228, 230, and 232 transition 234 across the display 208(B) such that program information pages corresponding to any number of previous or next programs in a high-speed programs review can be displayed.

At block 310, a viewer input is received to select the program information to initiate viewing the program as an on-demand selection. At block 312, a request is then communicated to the content distributor that provides the program for viewing. For example, a program of the on-demand media content 116 becomes selectable for on-demand viewing when the corresponding program information 136 is displayed on the display device 104. If a viewer selects to request the program that corresponds to the displayed program information 136, the playback application 126 at client device 102 can receive the viewer input and then request the program from the content distributor 106 for viewing.

Figure 4:
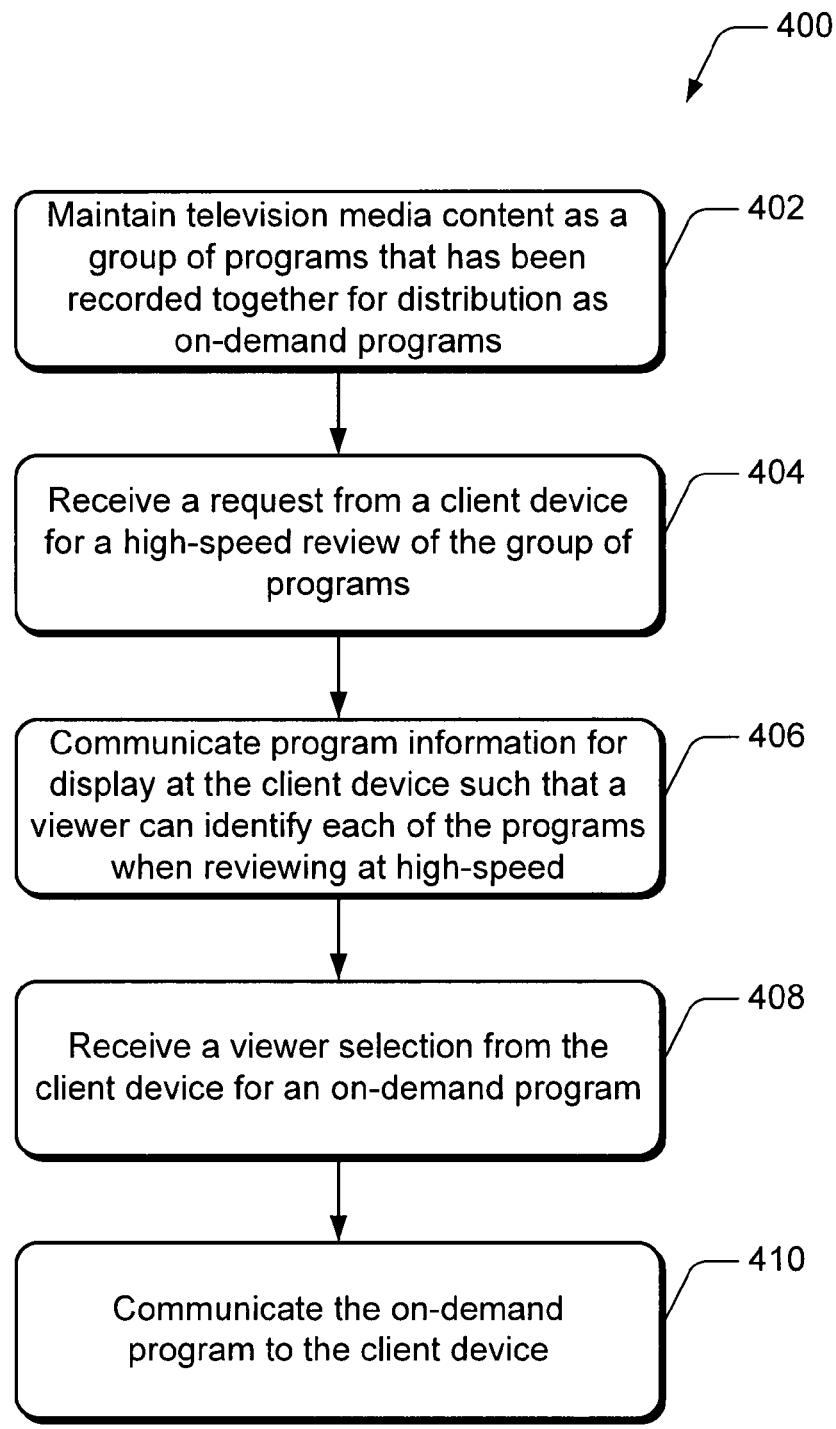
FIG. 4 illustrates example method(s) for high-speed programs review in accordance with one or more embodiments.

FIG. 4 illustrates example method(s) 400 of high-speed programs review, and is described with reference to content distributor 106 shown in FIG. 1. The order in which the method is described is not intended to be construed as a limitation, and any number of the described method blocks can be combined in any order to implement the method, or an alternate method.

At block 402, television media content is maintained as a group of programs that has been recorded together for distribution as on-demand programs. For example, content distributor 106 includes storage media 118 to maintain television media content as a group of programs (e.g., the on-demand media content 116) that has been recorded together for on-demand distribution.

At block 404, a request is received from a client device for a high-speed review of the group of programs. For example, a viewer can initiate a high-speed review of the recorded on-demand media content 116 that is maintained at the content distributor 106 with user inputs via selectable controls 128 of the remote control device 108. An asset manager 132 of the content distributor 106 can then receive the request 130 for a high-speed review of the on-demand media content 116 from the client device 102.

At block 406, program information is communicated for display at the client device such that a viewer can identify each of the programs when reviewing the programs at high-speed. For example, the content distributor 106 can communicate the program information 134 to the television client device 102 in response to the request to review the stored on-demand media content 116.

At block 408, a viewer selection is received from the client device for an on-demand program, and at block 410, the on-demand program is communicated to the client device. For example, a viewer can select to request a program that corresponds to the displayed program information 136, and the playback application 126 at client device 102 can receive the viewer input and then request the program from the content distributor 106 for viewing. The content distributor 106 receives the viewer request for the program from the client device and then distributes the requested on-demand program to the client device for viewing.

Figure 5:
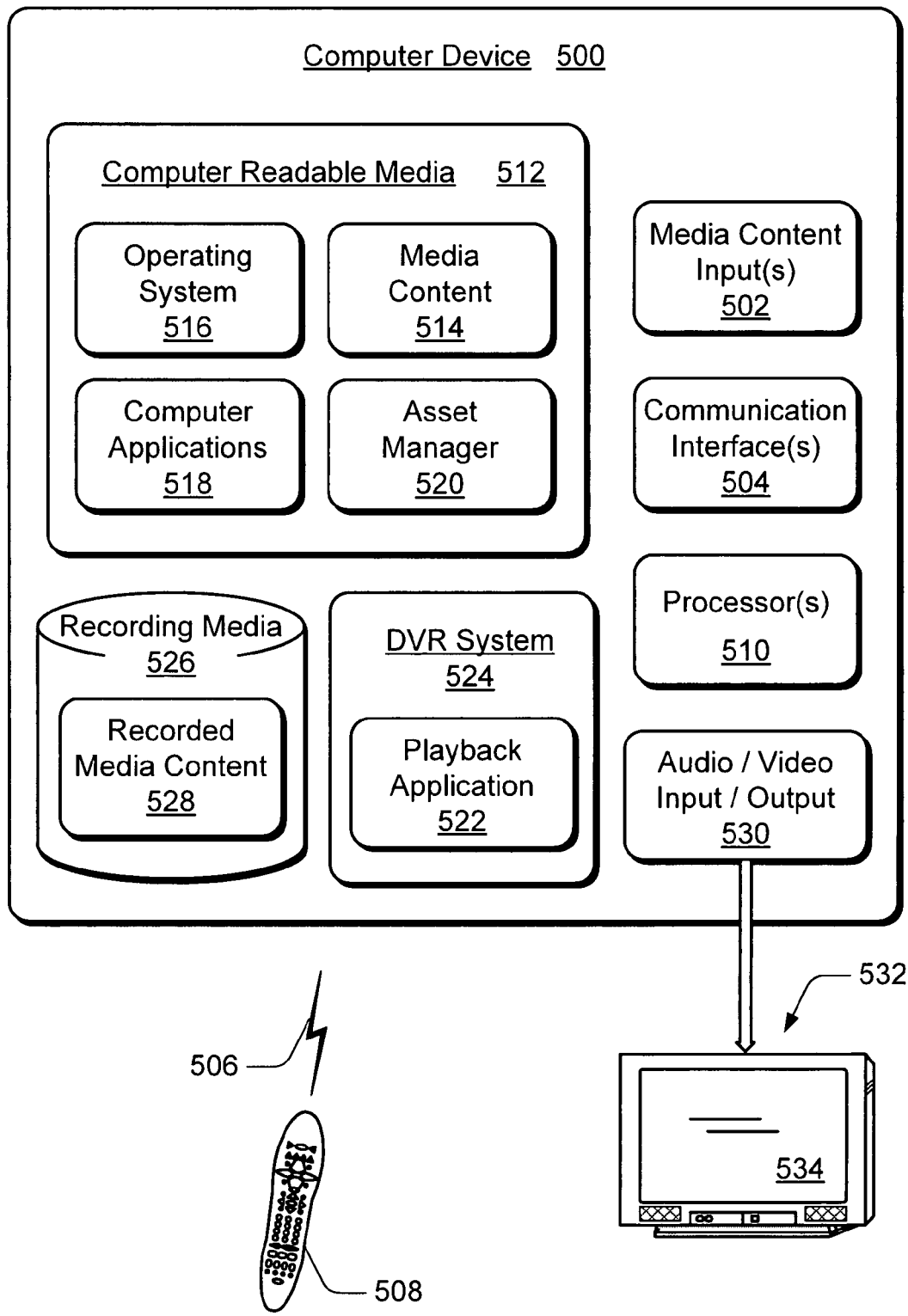
FIG. 5 illustrates various components of an example client device which can implement embodiments of high-speed programs review.

FIG. 5 illustrates various components of an example computer-based device 500 that can be implemented as any form of a computing, electronic, appliance, or television client device to implement embodiments of high-speed programs review. For example, computer device 500 can be implemented as television client device 102 or as the content distributor 106 shown in FIG. 1. In various embodiments, computer device 500 can be implemented as any one or combination of a television client device, a gaming system, or as any other computing-based device, such as a desktop computer, a portable computer, a television set-top box, a digital video recorder (DVR), an appliance device, a gaming console, and/or as any other type of computing-based client device.

Computer device 500 includes one or more media content inputs 502 that may include Internet Protocol (IP) inputs over which streams of media content are received via an IP-based network. Computer device 500 further includes communication interface(s) 504 that can be implemented as any one or more of a serial and/or parallel interface, a wireless interface, any type of network interface, a modem, and as any other type of communication interface. A network interface provides a connection between computer device 500 and a communication network by which other electronic and computing devices can communicate data with device 500.

Similarly, a serial and/or parallel interface provides for data communication directly between computer device 500 and the other electronic or computing devices. A modem also facilitates communication with other electronic and computing devices via a conventional telephone line, a DSL connection, cable, and/or other type of connection. A wireless interface enables computer device 500 to receive control input commands 506 and other information from an input device, such as from remote control device 508, a portable computing-based device (such as a cellular phone), or from another infrared (IR), 802.11, Bluetooth, or similar RF input device.

Computer device 500 also includes one or more processor(s) 510 (e.g., any of microprocessors, controllers, and the like) which process various computer-executable instructions to control the operation of device 500, to communicate with other electronic and computing devices, and to implement embodiments of high-speed programs review. Computer device 500 can be implemented with computer-readable media 512, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like.

Computer-readable media 512 provides data storage mechanisms to store media content 514 as well as other information and/or data such as software applications and any other types of information and data related to operational aspects of computer device 500. For example, an operating system 516 and/or other computer applications 518 can be maintained as software applications with the computer-readable media 512 and executed on processor(s) 510 to implement embodiments of high-speed programs review.

The computer applications can include an asset manager 520 when computer device 500 is implemented as a content distributor, and/or can include a playback application 522 when implemented as a television client device. The asset manager 520 and the playback application 522 are shown as software modules in this example to implement various embodiments of high-speed programs review as described herein. An example of the asset manager 520 is described with reference to asset manager 132 in content distributor 106 as shown in FIG. 1, and an example of the playback application 522 is described with reference to playback application 126 in client device 102 as shown in FIG. 1.

When implemented as a television client device, the computer device 500 can also include a DVR system 524 with playback application 522, and recording media 526 to maintain recorded media content 528 that computer device 500 receives and/or records. The recorded media content 528 can include the media content 514 that is received from a content distributor and recorded. For example, the media content 528 can be recorded when received as a viewer-scheduled recording, or when the recording media 526 is implemented as a pause buffer that records the media content 528 as it is being received and rendered for viewing.

Further, computer device 500 may access or receive additional recorded media content that is maintained with a remote data store (not shown). Computer device 500 may also receive media content from a video-on-demand server, or media content that is maintained at a broadcast center or content distributor that distributes the media content to subscriber sites and client devices. The playback application 522 can be implemented as a video control application to control the playback of media content 514, the recorded media content 528, and/or other video on-demand media content, music, and any other audio, video, and/or image media content which can be rendered and/or displayed for viewing.

Computer device 500 also includes an audio and/or video output 530 that provides audio and/or video data to an audio rendering and/or display system 532. The audio rendering and/or display system 532 can include any devices that process, display, and/or otherwise render audio, video, and image data. Video signals and audio signals can be communicated from computer device 500 to a display device 534 via an RF (radio frequency) link, S-video link, composite video link, component video link, DVI (digital video interface), analog audio connection, or other similar communication link. Alternatively, the audio rendering and/or display system 532 can be implemented as integrated components of the example computer device 500.

Figure 6:
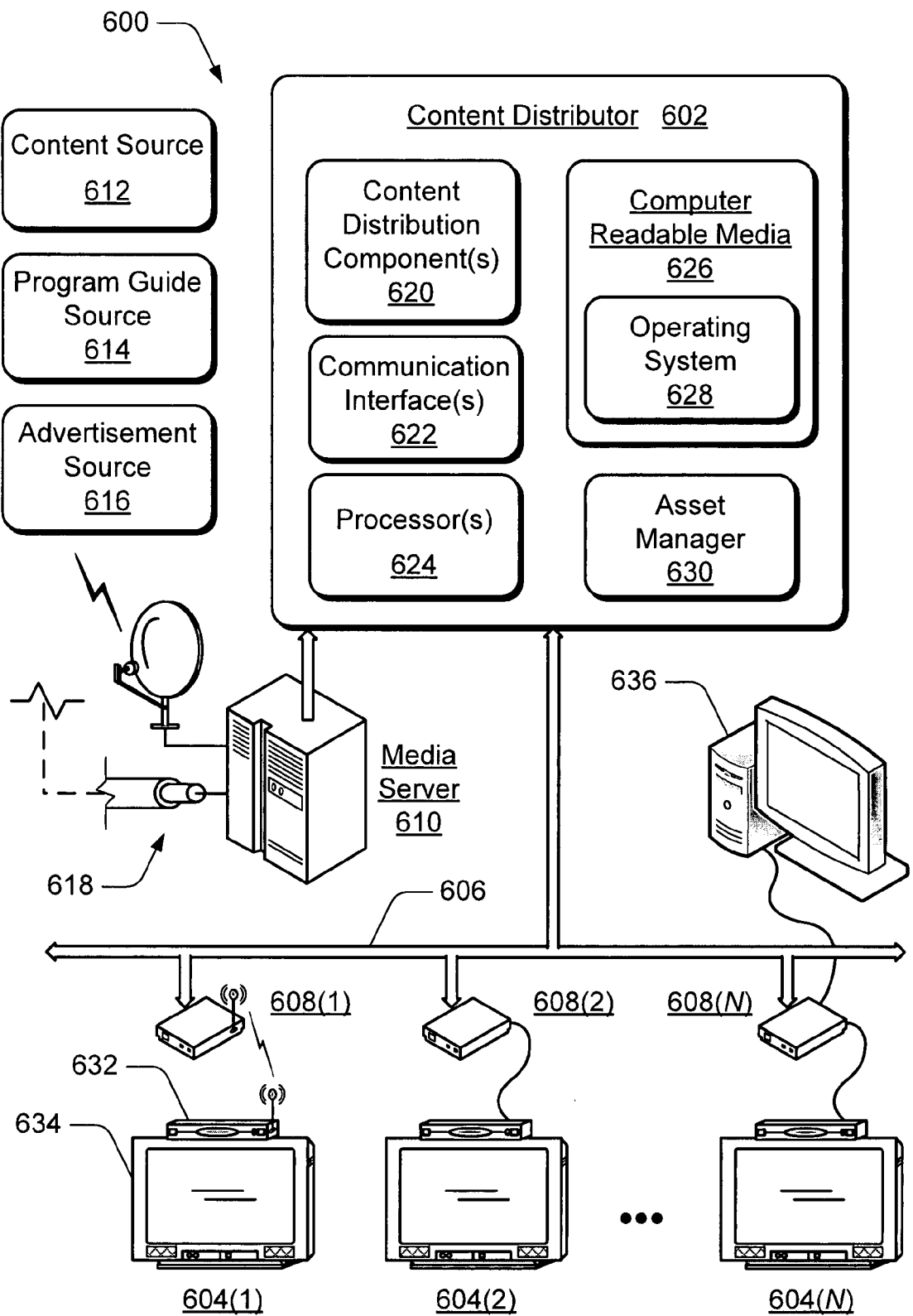
FIG. 6 illustrates various devices and components in an example entertainment and information system in which embodiments of high-speed programs review can be implemented.

FIG. 6 illustrates an example entertainment and information system 600 in which embodiments of high-speed programs review can be implemented. System 600 facilitates the distribution of media content, program guide data, and advertising content to multiple viewers and to multiple viewing systems. System 600 includes a content distributor 602 and any number "N" of client systems 604(1-N) each configured for communication via a communication network 606. Each of the client systems 604(1-N) can receive data streams of media content, program content, program guide data, advertising content, closed captions data, and the like from content server(s) of the content distributor 602 via the communication network 606.

The communication network 606 can be implemented as any one of combination of a wide area network (e.g., the Internet), a local area network (LAN), an intranet, an IP-based network, a broadcast network, a wireless network, a Digital Subscriber Line (DSL) network infrastructure, a point-to-point coupling infrastructure, or as any other media content distribution network. Additionally, communication network 606 can be implemented using any type of network topology and any network communication protocol, and can be represented or otherwise implemented as a combination of two or more networks. A digital network can include various hardwired and/or wireless links 608(1-N), routers, gateways, and so on to facilitate communication between content distributor 602 and the client systems 604(1-N).

System 600 includes a media server 610 that receives media content from a content source 612, program guide data from a program guide source 614, and advertising content from an advertisement source 616. In an embodiment, the media server 610 represents an acquisition server that receives the audio and video media content from content source 612, an EPG server that receives the program guide data from program guide source 614, and/or an advertising management server that receives the advertising content from the advertisement source 616.

The content source 612, the program guide source 614, and the advertisement source 616 control distribution of the media content, the program guide data, and the advertising content to the media server 610 and/or to other servers. The media content, program guide data, and advertising content can be distributed via various transmission media 618, such as satellite transmission, radio frequency transmission, cable transmission, and/or via any number of other wired or wireless transmission media. In this example, media server 610 is shown as an independent component of system 600 that communicates the program content, program guide data, and advertising content to content distributor 602. In an alternate implementation, media server 610 can be implemented as a component of content distributor 602.

Content distributor 602 is representative of a headend service in a content distribution system, for example, that provides the media content, program guide data, and advertising content to multiple subscribers (e.g., the client systems 604 (1-N)). The content distributor 602 can be implemented as a satellite operator, a network television operator, a cable operator, and the like to control distribution of media content, program and advertising content, such as movies, television programs, commercials, music, and other audio, video, and/or image content to the client systems 604(1-N).

Content distributor 602 includes various content distribution components 620 to facilitate media content processing and distribution, such as a subscriber manager, a device monitor, and one or more content servers. The subscriber manager manages subscriber data, and the device monitor monitors the client systems 604(1-N) (e.g., and the subscribers), and maintains monitored client state information.

Although the various managers, servers, and monitors of content distributor 602 (to include the media server 610 in one embodiment) are described as distributed, independent components of content distributor 602, any one or more of the managers, servers, and monitors can be implemented together as a multi-functional component of content distributor 602. Additionally, any one or more of the managers, servers, and monitors described with reference to system 600 can implement features and embodiments of high-speed programs review.

The content distributor 602 includes communication interface(s) 622 that can be implemented as any type of interface to communicate and receive off-air program guide data from client devices of the television system. The content distributor 602 also includes one or more processor(s) 624 (e.g., any of microprocessors, controllers, and the like) which process various computer-executable instructions to control the operation of content distributor 602. The content distributor 602 can be implemented with computer-readable media 626 which provides data storage to maintain software applications such as an operating system 628 and an asset manager 630. The asset manager 630 can implement one or more embodiments of high-speed programs review as described with reference to the asset manager 132 in the content distributor 106 shown in FIG. 1.

The client systems 604(1-N) can each be implemented to include a client device 632 and a display device 634 (e.g., a television, LCD, and the like). A client device 632 of a respective client system 604 can be implemented in any number of embodiments, such as a set-top box, a digital video recorder (DVR) and playback system, an appliance device, a gaming system, and as any other type of client device that may be implemented in an entertainment and information system. In an alternate embodiment, client system 604(N) is implemented with a computing device 636 as well as a client device. Additionally, any of the client devices 632 of a client system 604 can implement features and embodiments of high-speed programs review as described herein.

Although embodiments of high-speed programs review have been described in language specific to features and/or methods, it is to be understood that the subject of the appended claims is not necessarily limited to the specific features or methods described. Rather, the specific features and methods are disclosed as example implementations of high-speed programs review.

The invention claimed is:

1. A computer-implemented method at a client device, the method comprising:
   initiating a high-speed review of one or more programs in a group of programs that have been recorded together at a content distributor that maintains the programs for on-demand viewing, the high-speed review initiated by a playback application executed by a processor of the client device, the high-speed review of a program in the group of programs comprising a review of the program at a rate faster than twice (2×) a program playback speed;
   receiving program information images by which to identify each of the programs when the group of programs are displayed for review at high-speed;
   displaying a program information image that corresponds to the program in the group of programs;
   displaying a status indicator to indicate a review position in relation to the program that corresponds to the program information image;
   displaying an additional program information image that corresponds to at least one of a next program or a previous program when the group of programs is displayed for review at the high-speed; and
   displaying a transition from the program information image to the additional program information image, wherein the transition between the program information images displays as an appearance of a progression through and between the programs, and wherein the status indicator is further configured to transition over and between the program information image and the additional program information image.

2. A computer-implemented method as recited in claim 1, further comprising generating a user interface to display the program information images that correspond to each of the programs as they become selectable for on-demand viewing.

3. A computer-implemented method as recited in claim 1, wherein the high-speed review includes at least one of a high-speed rewind of the program in the group of programs or a high-speed advance of the program in the group of programs.

4. A computer-implemented method as recited in claim 1, wherein the programs in the group of programs were previously broadcast from the content distributor to television client devices for a particular television channel, and wherein the programs are stored at the content distributor as selectable on-demand programs.

5. A computer-implemented method as recited in claim 1, wherein the program information image that corresponds to the program includes at least one of a program information page or a program image page.

6. A computer-implemented method as recited in claim 1, wherein the program information image that corresponds to the program includes a video frame of the program.

7. A computer-implemented method as recited in claim 1, further comprising:
   receiving a viewer input to select the program information image that corresponds to the program; and
   communicating a request to the content distributor that provides the program for viewing as an on-demand selection.

8. A television client device, comprising:
   a media content input configured to receive program information images by which to identify programs when one or more programs in a group of programs is displayed for review at high-speed, the high-speed review of a program in the group of programs comprising a review of the program at a rate faster than twice (2×) a program playback speed;
   a playback application configured to request a high-speed review of the group of programs from a content distributor, the group of programs recorded together at the content distributor and maintained for on-demand selection, wherein the playback application is further configured to initiate a display of:
      a program information image that corresponds to the program;
      a status indicator to indicate a review position in relation to the program that corresponds to the program information image, the review position in relation to the program comprising a position of advancement of review in the program;
      an additional program information image that corresponds to at least one of a next program or a previous program when the group of programs is displayed for review at the high-speed; and
      a transition from the program information image to the additional program information image, wherein the transition between the program information images displays as an appearance of a progression through and between the programs, and wherein the status indicator is configured to transition over and between the program information images.

9. A television client device as recited in claim 8, wherein the playback application is further configured to initiate a display of the program information images that correspond to each of the programs when a program becomes selectable on the display for on-demand viewing.

10. A television client device as recited in claim 8, wherein the high-speed review includes at least one of a high-speed rewind of the program in the group of programs or a high-speed advance of the program in the group of programs.

11. A television client device as recited in claim 8, wherein the programs in the group of programs were previously broadcast from the content distributor for a particular television channel, and wherein the programs are stored at the content distributor as selectable on-demand assets.

12. A television client device as recited in claim 8, wherein the programs in the group of programs are related by a common program identifier.

13. A television client device as recited in claim 8, wherein the program information image that corresponds to the program includes at least one of a program information page or a program image page.

14. A television client device as recited in claim 8, wherein the program information image that corresponds to the program includes a video frame of the program.

15. A television client device as recited in claim 8, wherein the playback application is further configured to:
- receive a viewer input to select the program information image that corresponds to the program; and
- request the program that corresponds to the program information image from the content distributor that provides the program for viewing as an on-demand selection.

16. A content distributor, comprising:
- storage media configured to maintain television media content as a group of programs that have been recorded together for distribution as on-demand programs; and
- an asset manager configured to:
  - receive a request from a client device for a high-speed review of one or more programs in the group of programs, the high-speed review of a program in the group of programs comprising a review of the program at a rate faster than twice (2×) a program playback speed; and
  - communicate program information images that correspond to the programs in the group of programs for display at the client device, wherein a program information image that corresponds to the program is displayed and an additional program information image that corresponds to at least one of a next program or a previous program is displayed when the group of programs is displayed for review at the high-speed at the client device, wherein a transition between the program information images is displayed as an appearance of a progression through and between the programs, wherein a status indicator is displayed to indicate a review position advancement in the program, and wherein the status indicator is configured to transition over and between the program information images.

17. A content distributor as recited in claim 16, wherein the program information image that corresponds to the program includes at least one of a program information page, a program image page, or a video frame of the program.

18. A content distributor as recited in claim 16, wherein the high-speed review includes at least one of a high-speed rewind of the program in the group of programs or a high-speed advance of the program in the group of programs.

* * * * *